United States Patent
Weber et al.

(10) Patent No.: US 8,209,110 B2
(45) Date of Patent: *Jun. 26, 2012

(54) CALIBRATION SCHEME FOR AN EXHAUST GAS SENSOR

(75) Inventors: Dave Charles Weber, Toledo, OH (US); David John Kubinski, Canton, MI (US); Chuan He, Northville, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/270,819

(22) Filed: Oct. 11, 2011

(65) Prior Publication Data
US 2012/0029793 A1 Feb. 2, 2012

Related U.S. Application Data

(63) Continuation of application No. 12/409,231, filed on Mar. 23, 2009, now Pat. No. 8,036,814.

(51) Int. Cl.
*F02D 45/00* (2006.01)
*F01N 11/00* (2006.01)

(52) U.S. Cl. ..................................................... 701/109

(58) Field of Classification Search .................. 701/109, 701/108, 102, 114; 123/568.21, 568.26; 60/274, 277, 286, 297, 301

See application file for complete search history.

(56) References Cited

U.S. PATENT DOCUMENTS

| 4,393,840 | A | | 7/1983 | Tanaka et al. |
| 5,179,924 | A | | 1/1993 | Manaka |
| 5,329,764 | A | * | 7/1994 | Hamburg et al. ............... 60/285 |
| 5,952,555 | A | * | 9/1999 | Mobius .......................... 73/23.32 |
| 6,131,446 | A | | 10/2000 | Schnaibel et al. |
| 6,360,583 | B1 | | 3/2002 | Soltis et al. |
| 6,374,818 | B2 | | 4/2002 | Shinjyo et al. |
| 6,976,382 | B2 | | 12/2005 | Kadowaki et al. |
| 7,558,668 | B2 | | 7/2009 | Ammineni et al. |
| 8,036,814 | B2 | * | 10/2011 | Weber et al. ................... 701/109 |
| 2003/0052016 | A1 | * | 3/2003 | Lin et al. ........................ 204/408 |

* cited by examiner

*Primary Examiner* — Hieu T Vo
(74) *Attorney, Agent, or Firm* — Julia Voutyras; Alleman Hall McCoy Russell & Tuttle LLP

(57) ABSTRACT

Various systems and methods are described for controlling an engine in a vehicle in response to an equilibrium value of an exhaust gas constituent generated from an exhaust gas sensor. One example method comprises during engine fueling below a threshold amount where at least one intake valve and one exhaust valve of the engine are operating: generating an equilibrium value of an exhaust gas constituent reading of the exhaust gas sensor, the equilibrium value based on a trajectory of the exhaust gas constituent reading, and under selected engine combusting conditions, adjusting the sensor signal based on the equilibrium value.

20 Claims, 4 Drawing Sheets

CALIBRATION SCHEME FOR AN EXHAUST GAS SENSOR

CROSS REFERENCE TO RELATED APPLICATION

The present application is a continuation of U.S. patent application Ser. No. 12/409,231, filed Mar. 23, 2009, now U.S. Pat. No. 8,036,814, the entire contents of which are incorporated herein by reference for all purposes.

TECHNICAL FIELD

The present description relates generally to a gas sensor for measuring exhaust gas constituents from an internal combustion engine.

BACKGROUND AND SUMMARY

When new, gain and offset of exhaust gas sensors may be determined in order to calibrate the sensor so that accurate measurements of exhaust gas constituents may be obtained. Over time, however, sensor parameters can drift resulting in measurement error. For example, a sensor gain and offset, which are calibration parameters used to define a linear transformation from sensor output to a measured parameter, may drift during sensor operation. Thus, periodic updates of the sensor parameters, including sensor gain and offset, during the lifetime of the sensor may be used.

One method to calibrate the sensor during its lifetime in a motor vehicle includes measuring gain and offset during a period when the concentration of a desired gas constituent is known, such as deceleration fuel shut off (DFSO) when the exhaust gas may be comprised substantially of ambient air. However, the inventors herein have recognized a problem with this method. Specifically, during DFSO, the gasses in the vicinity of the sensor may not have enough time to reach a steady state (e.g., equilibrium) of ambient conditions as DFSO has a limited duration. In other words, residual exhaust gasses may remain in the vicinity of the sensor following the onset of DFSO due to gas mixing effects, exhaust and/or intake restrictions and cavities, the plurality of strokes comprising a combustion cycle, restrictions of the protective metal housing of the sensor itself, etc. For this reason, it may not be possible to correctly determine gain and offset of the sensor and, therefore, calibrate the sensor to provide accurate readings of exhaust gas constituents.

As such, in one approach, the above issue may be at least partially addressed by projecting an equilibrium value of a desired exhaust gas constituent reading of the exhaust gas sensor, such as during transient DFSO conditions where the sensor is exposed to a mixture of ambient air and exhaust gas. For example, during engine non-fueling conditions such as DFSO, an equilibrium value may be generated based on a trajectory of an exhaust gas constituent reading of the exhaust gas sensor. Specifically, generating the equilibrium value of the exhaust gas constituent reading based on the trajectory may include applying a projection model to a plurality of successive exhaust gas constituent readings taken during the engine non-fueling conditions. In this manner, the equilibrium value of an exhaust gas constituent may be estimated, and thus gain and/or offset of the sensor may be accurately determined, even if gasses in the vicinity of the sensor have not reached a steady state corresponding to ambient air.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a method for controlling an engine in a vehicle wherein a control system is configured to adjust one or more engine operating parameters based on an equilibrium value of an exhaust gas constituent reading generated by an exhaust gas sensor, such as a $NO_x$ reading of a $NO_x$ sensor. The equilibrium value may be obtained during engine non-fueling conditions such as deceleration fuel shut off (DFSO) in which the gasses in the exhaust gas are those of ambient air and concentrations of the gas constituents are known to a certain extent. Since the duration of DFSO may not be long enough for the gasses to reach a steady state of ambient air in the vicinity of the sensor, the equilibrium value of the exhaust gas constituent reading may be projected, since the trajectory may follow a repeatable pattern governed by exhaust mixing, etc. In some embodiments, a trajectory of the exhaust gas constituent readings may be generated by fitting a plurality of the constituent readings to a curve, such as an exponential curve, taking into account current operating conditions, such as engine speed, valve timing, throttle position, etc. Thus, an equilibrium value may be determined via projection even if the ambient air has not reached a steady state in the sensor and various operating parameters may be adjusted responsive to a corrected gas constituent reading.

Figure 1:
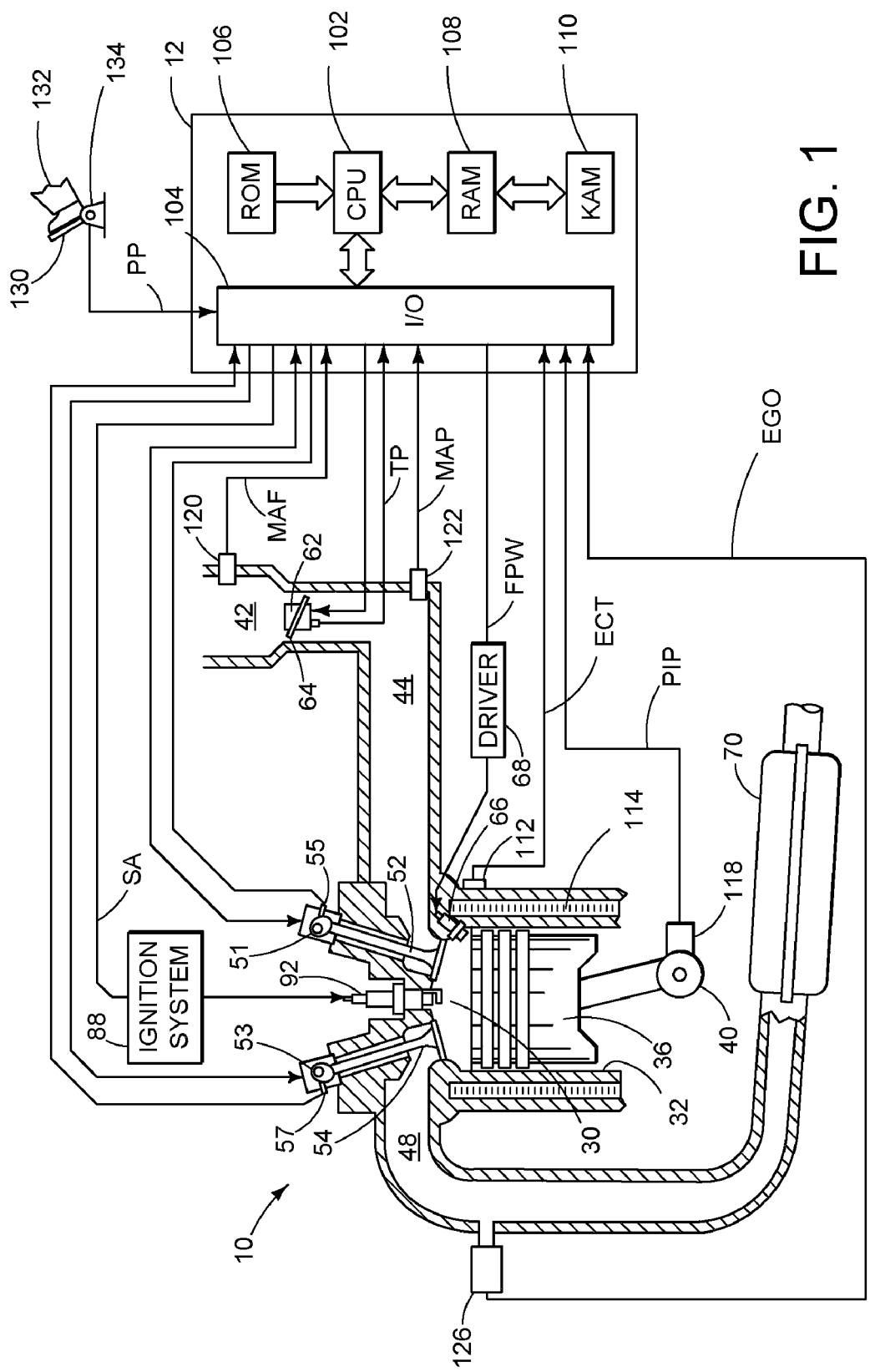
FIG. 1 shows a schematic diagram of a combustion chamber of an internal combustion engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition system 88, and with or without a throttle plate 64.

Exhaust gas sensor 126 is shown coupled to exhaust passage 48 upstream of emission control device 70. Alternatively, sensor 126 may instead be located downstream of the emission control device 70 (not shown in FIG. 1). In still further examples, the sensor may be located anywhere in the exhaust system. Sensor 126 may be any suitable sensor, such as a sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, $NH_3$ or CO sensor. Emission control device 70 is shown arranged along exhaust passage 48 downstream of exhaust gas sensor 126. Device 70 may be a three way catalyst (TWC), $NO_x$ trap, various other emission control devices, or combinations thereof. In some embodiments, during operation of engine 10, emission control device 70 may be periodically reset by operating at least one cylinder of the engine within a particular air/fuel ratio. Further, in some examples, a plurality of various exhaust gas sensors may be coupled to exhaust passage 48 in several locations, both upstream and downstream of device 70.

Controller 12 is shown in FIG. 1 as a microcomputer, including microprocessor unit 102, input/output ports 104, an electronic storage medium for executable programs and calibration values shown as read only memory chip 106 in this particular example, random access memory (RAM) 108, keep alive memory (KAM) 110, and a data bus. Controller 12 may receive various signals from sensors coupled to engine 10, in addition to those signals previously discussed, including, but not limited to, measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Figure 2:
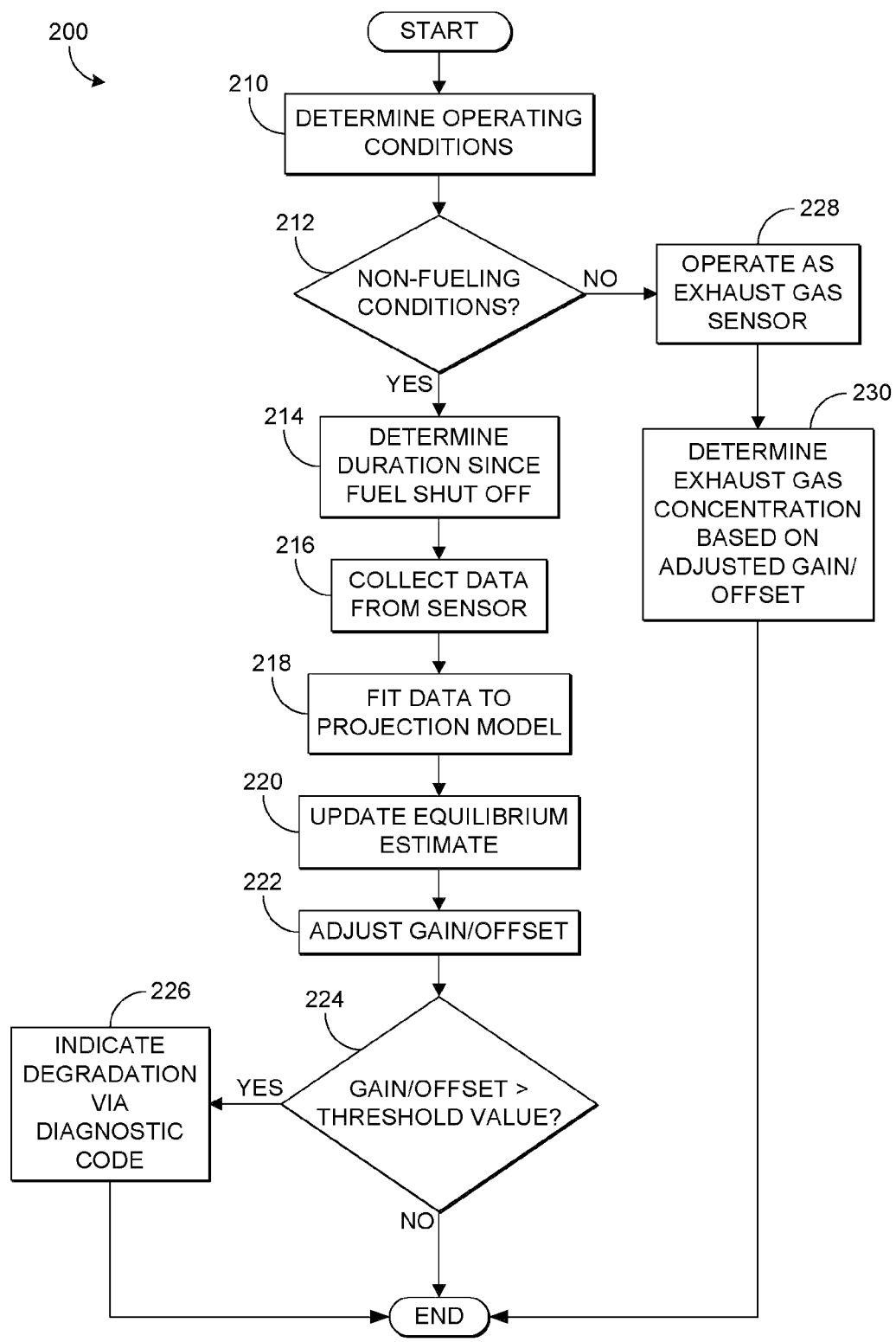
FIG. 2 shows a flow chart illustrating a routine for controlling an exhaust gas sensor according to the present disclosure.

FIG. 2 shows a flow chart illustrating a routine 200 for controlling an exhaust gas sensor, such as that indicated in FIG. 1, according to the present disclosure. Specifically, the procedure determines the operating mode of the sensor and subsequently operates the sensor in the specified mode to determine corresponding measurements. In one mode of operation, the sensor may be employed to determine an equilibrium value of an exhaust gas constituent reading, such as an equilibrium value of $NO_x$, in order to calibrate the sensor. In another mode of operation, the sensor may be operated as an exhaust gas sensor to determine a concentration of an exhaust gas constituent (e.g., $NO_x$) in the exhaust gas during engine combustion.

It will be appreciated that the exhaust gas sensor in the present description may be a variety of different sensors. For example, in some embodiments, the exhaust gas sensor may be a $NO_x$ sensor for detecting a concentration of $NO_x$ in emissions. In other embodiments, the exhaust gas sensor may be a universal exhaust gas oxygen (UEGO) sensor for detecting an oxygen concentration of the exhaust gas corresponding to an air-fuel ratio. In further embodiments, the exhaust gas sensor may be an ammonia ($NH_3$) sensor for detecting $NH_3$ in vehicles that may include a selective catalytic reduction (SCR) system coupled to the exhaust.

At 210 of routine 200 in FIG. 2, engine operating conditions are determined. These may include, but are not limited to, amount of exhaust gas recirculation (EGR), air-fuel ratio, and exhaust gas temperature.

Once the operating conditions are determined, it is determined if an engine fueling amount is below a threshold amount at 212 of routine 200. Engine fueling below a threshold amount includes non-fueling engine operating conditions in which the fuel supply is interrupted but the engine continues spinning and at least one intake valve and one exhaust valve (e.g., the intake valve and the exhaust valve of the same cylinder) are operating; thus, air is flowing through one or more of the cylinders, but fuel is not injected in the cylinders. Under non-fueling conditions, combustion is not carried and ambient air may move through the cylinder from the intake to the exhaust. In this way, a sensor, such as a UEGO sensor, may receive ambient air on which measurements, such as generating an equilibrium value of oxygen, may be performed.

Non-fueling conditions may include, for example, deceleration fuel shut off (DFSO). DFSO is responsive to the operator pedal (e.g., in response to a driver tip-out and where the vehicle decelerates greater than a threshold amount). DSFO conditions may occur repeatedly during a drive cycle, and, thus, there may be numerous opportunities to generate an equilibrium value of an exhaust gas constituent reading throughout the drive cycle, such as during each DFSO event. As such, the overall efficiency of the engine may be maintained as the gain and/or offset of an exhaust gas sensor fluctuate throughout its lifetime. The gain and offset of a sensor may drift as the sensor ages, for example. The length of time DFSO conditions last, however, may vary, as will be described below.

Engine fueling below a threshold amount may also include engine fueling conditions in which there is reduced fuel injection. The reduced fuel injection may include situations in which the driver did not issue a torque request, such as, for example, fuel injection used to maintain aftertreatment (e.g., exhaust) temperature, or to adapt fuel injectors, where the fuel injection amount is less than a threshold fuel injection amount, such as less than 3% of maximum fuel injection, and in one example less than 1%.

If it is determined that engine fueling conditions are below a threshold amount at 212, routine 200 proceeds to 214 where a duration since fuel shut off is determined. Residual gases from one or more previous combustion cycles may remain in the exhaust for several cycles after fuel is shut off and the gas that is exhausted from the chamber may contain more than ambient air. As stated above, it is desirable to generate an equilibrium value of an exhaust gas constituent reading when gas constituent concentrations are known, such as the constituent concentrations of ambient air. Measurement of an equilibrium value may be delayed for a duration after fuel shut off, therefore, in order to allow previously combusted gases to exit the exhaust and ambient air to reach a steady state in the area where the sensor is positioned. In some embodiments, the duration may be a period of time since fuel shut off. In other embodiments, the duration may be a number of engine cycles since fuel shut off.

Furthermore, the length of the duration, or time constant, may vary based on factors including, but not limited to, engine speed, airflow, valve timing, exhaust gas temperature, exhaust system geometry, sensor location in the exhaust, emission control device 70 design and location, sensor geometry, and sensor temperature. For example, if the RPM of the engine is high, the engine cycle has a faster rate than that of an engine operating at a low speed, and exhaust gases are expelled from the cylinders at a higher rate. As a result, the gases in the vicinity of the sensor may reach a steady state of ambient conditions in less time (e.g., the trajectory has a faster exponential decay) and the duration after fuel shut off may be shorter for an engine operating at high speed compared to an engine operating at a low speed.

In another example, airflow to the cylinders (e.g., position of the throttle plate, TP) may affect the time constant of the trajectory. For example, closing the throttle during DFSO will decrease the airflow thus slowing the exponential decay of the trajectory and the delaying time at which the gases in the vicinity of the exhaust gas sensor may reach a steady state corresponding to ambient air. In some examples, the throttle may be opened for an initial duration following the onset of DFSO in order to allow the gases in the vicinity of the sensor to reach a steady state faster.

In a further example, variable cam timing, and thus valve timing, may affect the amount of air entering the cylinders and, as a result, the time constant of the trajectory. For example, the decay of the trajectory may be slowed if the intake valve timing and the exhaust valve timing are both retarded; thus, there may be a longer period of time before an equilibrium value may be generated.

In still another example, sensor temperature may influence the duration before an equilibrium value may be generated. For example, the temperature of the sensor may have risen above a threshold temperature due to hot exhaust gases. Above the threshold temperature, the sensor may not generate accurate readings; thus, the sensor must cool to below the threshold temperature before exhaust gas constituent data may be obtained.

Further, there may be other examples of factors affecting the time constant. Such factors may be determined by testing a vehicle design and may be compensated for within the microprocessor unit.

Following the delay after fuel shut off, routine 200 of FIG. 2 proceeds to 216 where exhaust gas constituent data is collected from the sensor. The exhaust gas sensor is operated in a mode such that a plurality of successive exhaust gas constituent readings is taken. As noted above, the period in which fuel is shut off may vary. For example, a vehicle operator may release the accelerator pedal and coast to a stop, resulting in a long DFSO period. In some situations, the fuel shut off period (the time from interruption of the fuel supply to restart of the fuel supply, for example) may not be long enough for the ambient air to establish an equilibrium state in the exhaust system; thus, an equilibrium value of the exhaust gas constituent reading may not be obtained. For example, a vehicle operator may tip-in shortly after releasing the accelerator pedal, causing DFSO to stop soon after beginning. Further, the fuel shut off period may not have a long enough duration for the sensor signal to reach a steady state indicating an equilibrium value of an exhaust gas constituent. In such a situation, routine 200 proceeds to 218.

At 218 of routine 200, a trajectory of the exhaust gas constituent reading is determined via application of a projection model to the plurality of successive exhaust gas constituent readings. The projection model may be an exponential curve, for example. The control system may include instructions for interpreting the curve in order to identify variables, including an equilibrium value of a desired exhaust gas constituent reading. In this way, the equilibrium value of an exhaust gas constituent reading may be estimated, or projected, based on the trajectory of the reading during the fuel shut off event, even if the fuel shut off period is not long enough for the exhaust gas sensor to reach a steady signal indicating the equilibrium value of the exhaust gas constituent reading. In some examples, the projection model may be a recursive least squares fit applied to an exponential decay curve out to an equilibrium value at infinite time utilizing fastest sampling time that is practical.

Figure 3:
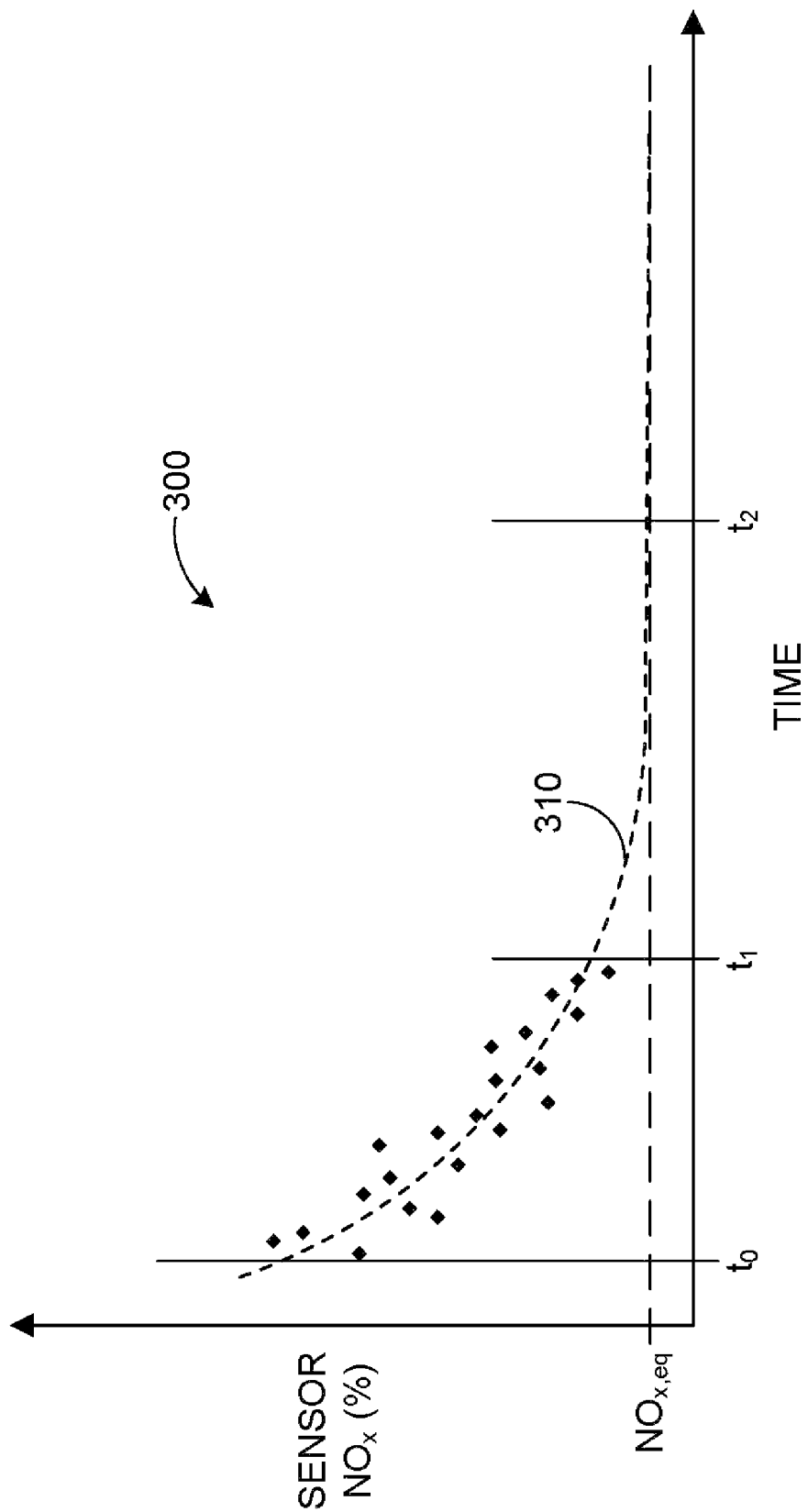
FIG. 3 shows an example of a projection model applied to exhaust gas sensor data.

FIG. 3 illustrates an example of an exponential projection model applied to exhaust gas constituent reading data. The example graph 300 of FIG. 3 shows a percentage of $NO_x$ as detected by a $NO_x$ sensor over time. In the example, the end of the delay since fuel shut off is indicated as time $t_0$. At time $t_0$, the sensor begins generating successive $NO_x$ readings (denoted by diamonds). Non-fueling condition, such as DFSO, may end at time $t_1$, a time at which the $NO_x$ sensor signal has not yet reached a steady state; thus an accurate equilibrium value of the $NO_x$ reading may not be determined at time $t_1$. However, with the application of the projection model to the plurality of $NO_x$ readings generated during the DFSO event (denoted by the dashed curve 310), an equilibrium $NO_x$ value $NO_{x,eq}$ may be estimated as though it is a later time $t_2$, at which the generated $NO_x$ readings have reached an equilibrium (or within 0-5% of an equilibrium, and specifically 2-3% of an equilibrium) value $NO_{x,eq}$.

Turning back to FIG. 2, at 220 of routine 200, the equilibrium estimate is updated and the gain or offset is adjusted at 222. The estimated equilibrium value $NO_{x,eq}$ in FIG. 3 may correspond to an offset for the $NO_x$ sensor. For example, the concentration of $NO_x$ in ambient air is 0%. If a concentration other than 0% $NO_x$ is estimated as the equilibrium value (e.g., 0.01%), the offset of the sensor is adjusted to reflect the new value. Further, the sensor may have an existing offset (e.g., 0.005%). In this situation, the existing offset is adjusted to reflect the new equilibrium value. In some embodiments, an implementation of this adjustment may be through the use of a weighted average filter. Similar to a $NO_x$ sensor, the equilibrium value of an ammonia sensor may correspond to an offset of the sensor (e.g., 0% $NH_3$ in ambient air). In the example of a UEGO sensor, the equilibrium value may correspond to a gain of the sensor (e.g., 20.95% $O_2$ in ambient air). Thus, there may be multiple routines 200 in the controller to control multiple exhaust gas sensors coupled to the same engine propulsion system.

As will be described later with respect to FIG. 4, one or more engine operating parameters may be adjusted in response to the adjusted gain or offset of the sensor during subsequent engine fueling operation and one or more exhaust gas sensors may be simultaneously adjusted.

At 224 of routine 200 in FIG. 2, it is determined if the adjusted gain or offset of the sensor exceeds a threshold value. For example, if the adjusted offset of a $NO_x$ sensor is too high, the sensor may not be functioning properly. If the adjusted gain or offset does exceed a threshold value (or values), routine 200 proceeds to 226 where sensor degradation is indicated and a signal is sent to the vehicle operator. In some embodiments, sensor degradation may be indicated via a diagnostic code sent to the control system. In other embodiments, a flag may be set to indicate sensor degradation. These codes and flags may be accumulated prior to alerting the vehicle operator.

Referring back to 212 in FIG. 2, if it is determined that an engine fueling amount is greater than a threshold amount, for example, fuel is injected in one or more cylinders of the engine, routine 200 advances to 228. At 228, the sensor is operated as an exhaust gas sensor. In one example, the exhaust gas sensor may be a $NO_x$ sensor which is operated to measure the $NO_x$ concentration in emissions.

At 230 of routine 200, an exhaust gas constituent concentration is determined based on the adjusted gain or offset. For example, a $NO_x$ sensor may determine there is a certain amount of $NO_x$ in the exhaust gases. Once an amount of $NO_x$ is determined, the reading is adjusted by an amount corresponding to the adjusted offset previously determined at 222 of routine 200 and stored in RAM or KAM of the controller. In this way, a more accurate $NO_x$ measurement is generated and one or more engine operating parameters may be adjusted accordingly.

Figure 4:
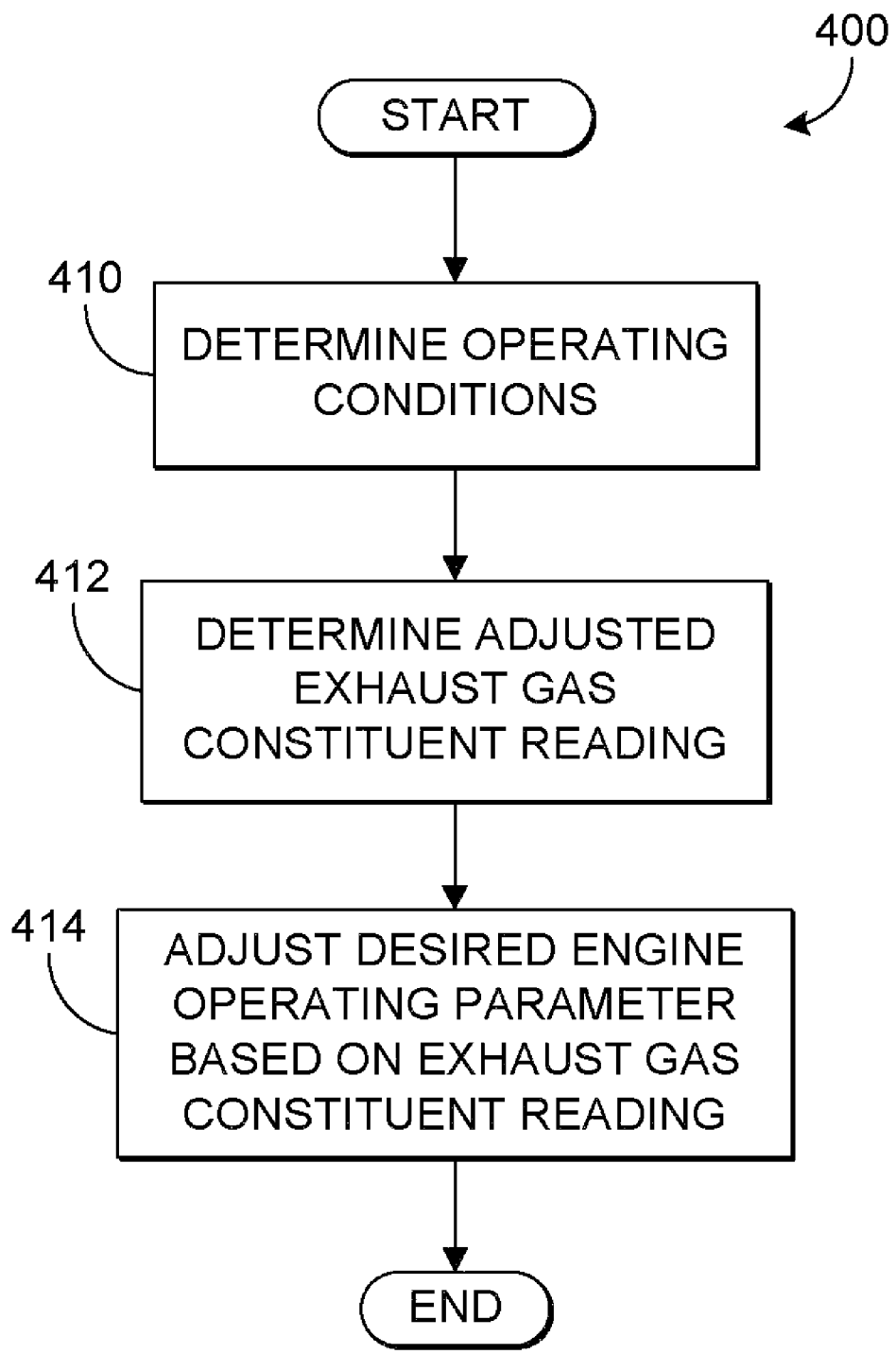
FIG. 4 is a flow chart illustrating a control routine for adjusting engine operating parameters.

FIG. 4 shows a flow chart illustrating a control routine 400 for adjusting engine operating parameters responsive to an adjusted exhaust gas constituent reading. Specifically, one or more engine operating parameters may be adjusted corresponding to an adjusted concentration of an exhaust gas constituent. For example, an adjusted exhaust gas constituent reading may indicate a higher concentration of $NO_x$. If one or more engine operating parameters are not adjusted accordingly, the amount of $NO_x$ emitted by the vehicle may be too high.

At 410 of routine 400, engine operating conditions are determined. In particular, the operating conditions may include an amount of exhaust gas recirculation and air-fuel ratio, among others, which may affect the concentration of various exhaust gas constituents. Once the operating conditions are established, the routine continues to 412 where an adjusted exhaust gas constituent reading is determined. The adjusted exhaust gas constituent reading may be determined with an exhaust gas sensor via the methods described above.

Responsive to the adjusted exhaust gas constituent reading determined at 412, a plurality of operating parameters may be adjusted under selected engine combusting conditions at 414 of routine 400. Such operating parameters may include an amount of EGR, urea flow rate for a selective catalytic reduction (SCR) device, spark timing, valve timing, injector flow, and turbo-boost pressure, among others. In internal combustion engines, it is desirable to control engine operating parameters, such as EGR flow and air-fuel ratio, in order to optimize engine performance and emissions. In some embodiments, only one parameter may be adjusted in response to a measured change in an exhaust gas constituent concentration. In other embodiments, any combination or subcombination of operating parameters may be adjusted in response to an adjusted exhaust gas constituent reading.

The following examples will be described with respect to a $NO_x$ sensor. It will be appreciated, however, that the examples may be applied to other exhaust gas constituent sensors, such as UEGO sensors, $NH_3$ sensors, sensors that sense several gases, etc.

In one embodiment, an amount of exhaust gas recirculation (EGR) may be adjusted based on an adjusted $NO_x$ reading of a $NO_x$ sensor, for the example of an upstream feedgas $NO_x$ sensor position. In at least one condition, the EGR flow may be increased in at least one cylinder during subsequent fueling operation in response to an adjusted $NO_x$ reading indicating a higher concentration of $NO_x$ in the emissions. If an adjusted $NO_x$ reading indicates a higher concentration of $NO_x$, the EGR flow may be increased in order to decrease the $NO_x$ emissions and compensate for the adjusted $NO_x$ offset.

In another embodiment, the air-fuel ratio may be adjusted based on the generated equilibrium value and subsequently adjusted $NO_x$ reading of a $NO_x$ sensor positioned downstream of a lean NOx trap. In at least one condition, the air-fuel ratio may be decreased responsive to a decrease in $NO_x$ concentration in the exhaust gas corresponding to an adjusted $NO_x$ reading. In some examples, the air-fuel ratio may be decreased by injecting more fuel into one or more cylinders and maintaining the airflow. Alternatively, the air-fuel ratio may be decreased by decreasing the airflow to one or more cylinders and maintaining the amount of fuel injected. In this way, it is possible to reduce the $NO_x$ generated by modifying the air-fuel ratio in response to the adjusted $NO_x$ reading.

Furthermore, a $NO_x$ sensor may be employed for outputting an $O_2$ signal and an equilibrium value of the $O_2$ signal may be determined, where the sensor is positioned upstream and/or downstream of a catalyst. Subsequent $O_2$ readings may be adjusted based on the equilibrium value of $O_2$, and the air-fuel ratio may be adjusted based on the adjusted $O_2$ reading, where the $O_2$ signal is used as feedback control for maintaining a desired air-fuel ratio. In addition, airflow to one or more cylinders may be increased or decreased in order to maintain the desired air-fuel ratio. For example, in at least one condition, if an adjusted $O_2$ reading indicates a greater amount of oxygen, airflow to one or more cylinders may be decreased in order to maintain the desired air-fuel ratio.

In this way, engine operating parameters may be adjusted responsive to an adjusted exhaust gas constituent reading generated by an exhaust gas sensor coupled to an engine exhaust system.

As DFSO may occur numerous times during a drive cycle, an equilibrium value of an exhaust gas constituent reading may be generated several times throughout the drive cycle and one or more engine operating parameters may be adjusted accordingly, resulting in an improved overall engine performance despite fluctuations in the gain and/or offset of an exhaust gas sensor.

As noted, the type of feedback control that is based on the gas constituent sensor may vary depending on the aftertreatment system and the type of sensor. For example, the sensor may provide feedback for air-fuel ratio control of 3-way catalytic systems, and urea spray control of diesel SCR aftertreatment systems. The adjustment of $NH_3$ and/or $NO_x$ sensors would include adjustment of the offset (since $NH_3$ and $NO_x$ go towards zero ppm during non-fueling conditions), while the adjustment of a UEGO would include adjustment to the gain (since % $O_2$ goes towards 21% during non-fueling conditions, although UEGO offset may also be adjusted in non-fueling conditions).

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system. It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, gasoline, diesel and other engine types and fuel types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A system for an engine in a vehicle, the system comprising:
   an engine exhaust system;
   one or more exhaust gas sensors coupled in the exhaust providing exhaust gas constituent readings indicating exhaust gas constituents; and
   a control system including a computer readable storage medium, the medium including instructions thereon, the control system receiving communication from the exhaust gas sensor, the medium comprising:
   instructions for, during engine fueling below a threshold amount, identifying an equilibrium value of the exhaust gas constituent reading, where the identified equilibrium value is based on an exponentially decaying trajectory of a plurality of exhaust gas constituent readings during the engine non-fueling condition, instructions for adjusting an engine operating condition in response to the identified equilibrium value.

2. A method for controlling an engine of a vehicle during engine operation, the engine having an exhaust and an exhaust gas sensor coupled in the engine exhaust, the method comprising:
   during engine operating conditions, including engine fueling below a threshold amount, where at least one intake valve and one exhaust valve of the engine are operating:
   generating an equilibrium value of an exhaust gas constituent reading of the exhaust gas sensor, the equilibrium value based on a trajectory of a plurality of exhaust gas constituent readings, the plurality of readings including readings taken during conditions when the engine fueling is below the threshold amount; and
   under selected engine combusting conditions, adjusting an engine operating parameter based on the equilibrium value.

3. The method of claim 2 wherein engine fueling below a threshold amount includes deceleration fuel shut off during engine non-fueling conditions, and where the plurality of readings include a plurality of successive readings.

4. The method of claim 3 wherein the equilibrium value is generated after a duration since fuel shut off.

5. The method of claim 3 wherein generating an equilibrium value of the exhaust gas constituent reading based on the trajectory includes applying a projection model to the plurality of successive exhaust gas constituent readings, wherein the projection model is a least squares statistical best fit to an ideal exponential decay curve out to an equilibrium value at infinite time.

6. The method of claim 2 wherein engine fueling below a threshold amount includes conditions with fuel injection being less than 3% of a maximum fuel injection.

7. The method of claim 2 wherein the exhaust gas sensor is a universal exhaust gas oxygen sensor or a $NO_x$ sensor outputting an oxygen signal.

8. The method of claim 2 wherein the exhaust gas sensor is a $NO_x$ sensor.

9. The method of claim 2 wherein the exhaust gas sensor is an ammonia sensor.

10. The method of claim 2 wherein the sensor is an exhaust gas constituent sensor.

11. The method of claim 2 wherein the engine operating parameter includes an amount of exhaust gas recirculation during subsequent engine combustion.

12. The method of claim 11 wherein, in at least one condition, the amount of exhaust gas recirculation is increased responsive to an increase in the generated equilibrium value.

13. The method of claim 2 wherein the engine operating parameter includes control to an air-fuel ratio during subsequent engine combustion.

14. The method of claim 13 wherein, in at least one condition, the air-fuel ratio is decreased responsive to a decrease in the generated equilibrium value.

15. The method of claim 2 further comprising indicating sensor degradation via a diagnostic code responsive to the generated equilibrium value crossing a threshold value.

16. A method of measuring exhaust $NO_x$ via an exhaust gas sensor, comprising:
during engine operation and during engine fueling below a threshold amount, where cam-driven cylinder intake and exhaust valves are operating: generating an equilibrium $NO_x$ value of a $NO_x$ sensor $NO_x$ reading, the equilibrium value based on an exponentially decaying trajectory of the $NO_x$ reading; and
adjusting a subsequent $NO_x$ reading during subsequent engine combustion based on the equilibrium $NO_x$ value.

17. The method of claim 16 wherein engine fueling below a threshold amount includes deceleration fuel shut off during non-fueling conditions.

18. The method of claim 17 wherein the equilibrium value is generated after a duration since fuel shut off.

19. The method of claim 17 wherein generating the equilibrium $NO_x$ value of the $NO_x$ reading based on the trajectory includes generating the trajectory based on a plurality of $NO_x$ readings.

20. The method of claim 16 wherein fueling below a threshold amount includes reduced fuel injection sufficient to maintain emission control device operating temperature when an operator requested torque is at or less than zero.

* * * * *